… … …

(12) United States Patent
Hojo

(10) Patent No.: US 7,420,356 B2
(45) Date of Patent: Sep. 2, 2008

(54) CURRENT DIRECTION DETECTION CIRCUIT AND SWITCHING REGULATOR HAVING THE SAME

(75) Inventor: Yoshiyuki Hojo, Kyoto (JP)

(73) Assignee: Rohm Co., Ltd, Kyoto (JP)

( * ) Notice: Subject to any disclaimer, the term of this patent is extended or adjusted under 35 U.S.C. 154(b) by 0 days.

(21) Appl. No.: 10/598,133

(22) PCT Filed: Feb. 15, 2005

(86) PCT No.: PCT/JP2005/002270

§ 371 (c)(1),
(2), (4) Date: Apr. 11, 2007

(87) PCT Pub. No.: WO2005/081385

PCT Pub. Date: Sep. 1, 2005

(65) Prior Publication Data
US 2008/0024098 A1 Jan. 31, 2008

(30) Foreign Application Priority Data
Feb. 19, 2004 (JP) ............................. 2004-042277

(51) Int. Cl.
*G05F 1/569* (2006.01)
*G05F 1/40* (2006.01)

(52) U.S. Cl. ........................ 323/276; 323/282

(58) Field of Classification Search ................ 323/276, 323/277, 278, 282, 312, 313, 351; 361/18
See application file for complete search history.

(56) References Cited

U.S. PATENT DOCUMENTS

| | | | | |
|---|---|---|---|---|
| 6,847,197 B2* | 1/2005 | Susak et al. | ................. | 323/266 |
| 7,132,818 B2* | 11/2006 | Matsuura | ..................... | 323/222 |
| 7,245,116 B2* | 7/2007 | Tateno et al. | ................ | 323/316 |
| 7,298,122 B2* | 11/2007 | Bernacchia et al. | ......... | 323/282 |
| 7,323,850 B2* | 1/2008 | Ryu et al. | .................... | 323/222 |

FOREIGN PATENT DOCUMENTS

JP 2000-092824 A 3/2000

* cited by examiner

*Primary Examiner*—Adolf Berhane
(74) *Attorney, Agent, or Firm*—Keating & Bennett, LLP

(57) ABSTRACT

A current direction detection circuit includes a monitoring transistor having a control terminal and an output terminal respectively connected with a control terminal and an output terminal of a ground side output transistor; an impedance element having one terminal connected with an input terminal of the monitoring transistor and the other terminal grounded; first and second constant-current sources; a diode-connected reference transistor interposed between the first constant-current source and ground potential; and a sensing transistor interposed between the second constant-current source and the impedance element and having a control terminal connected with the control terminal of the reference transistor. The current direction detection circuit is small yet capable of minimizing power loss of a switching regulator.

2 Claims, 3 Drawing Sheets

CURRENT DIRECTION DETECTION CIRCUIT AND SWITCHING REGULATOR HAVING THE SAME

BACKGROUND OF THE INVENTION

1. Field of the Invention

The present invention relates to a current direction detection circuit that, when reverse direction current flows in a ground side output transistor, is capable of detecting the flow of current, and relates to a switching regulator including the current direction detection circuit.

2. Description of the Related Art

A switching regulator is provided with a power source side output transistor, that defines a main switching element, between a terminal that inputs power and a terminal that is connected with the load and outputs a predetermined DC voltage, and maintains a predetermined DC voltage by turning on/off (conductive/non-conductive) the power source side output transistor. Such regulators are of small size and are capable of achieving high power efficiency and thus are widely used. In recent years, synchronous rectifying switching regulators have been used (see, for example, Japanese Patent Application Laid-open No. 2000-92824), in which a ground side output transistor is additionally provided, defining a synchronous rectifying switching element. Such synchronous rectifying switching regulators make it possible to further improve power efficiency.

FIG. 3 shows the layout of a conventional synchronous rectifying switching regulator. The switching regulator 101 includes a power source side output transistor 111 defined by a P type MOS transistor and a ground side output transistor 112 defined by an N type MOS transistor connected in series between the input power source $V_{CC}$ and ground potential; a smoothing circuit 113 whose input terminal is connected to a point between the two transistors 111, 112 and whose output terminal is connected with the output terminal OUT, respectively; a regulator control circuit 115 that outputs a control signal A and control signal B that perform on/off control of the power source side output transistor 111 and ground side output transistor 112 so as to maintain a predetermined DC voltage in response to feedback input of the voltage of the output terminal OUT; a current direction detection circuit 116 that, when reverse direction current flows in the ground side output transistor 112, detects the reverse direction current and outputs a control signal F; and a ground side output transistor control circuit 117 that outputs an output signal C for controlling the ground side output transistor 112 in accordance with the control signal B and control signal F. In this case, a load 114 is connected at the outside to the output terminal OUT. Also, the smoothing circuit 113 includes a smoothing coil 140 having one terminal connected with the connection point (node D) of the power source side output transistor 111 and the ground side output transistor 112 and the other terminal connected with the output terminal OUT, and a smoothing capacitor 141 having one terminal connected with the output terminal OUT and the other terminal grounded. Also, the control signal A and the control signal B that are output by the regulator control circuit 115 have substantially the same waveform.

The current direction detection circuit 116 includes a comparator 120 that performs a comparison by respectively inputting the voltage of the node D at its inversion input terminal and ground potential at its non-inversion input terminal. Also, the ground side output transistor control circuit 117 includes an AND circuit 130 that inputs the control signal B of the regulator control circuit 115 and the control signal F of the current direction detection circuit 116, and a buffer 131 that delivers an output with an increased current capability.

Next, the operation of the switching regulator 101 will be described with reference to FIG. 4. In FIG. 4, $V_B$ is the voltage of the control signal B of the regulator control circuit 115, $V_C$ is the voltage of the output signal C of the ground side output transistor control circuit 117, $I_O$ is the current flowing in the ground side output transistor 112, and $V_D$ is the voltage at the node D. It should be noted that FIG. 4 shows the waveform when the load 114 is light, the case where the load 114 is large is not shown.

In the period in which control signal B is low level, the output signal C is low level, and the ground side output transistor 112 is turned off. The control signal A is also low level, so the power source side output transistor 111 is turned on. Consequently, the current $I_O$ flowing in the ground side output transistor 112 is zero, and the voltage $V_D$ at the node D is high level.

Since, when the control signal B is high level, the control signal A is also high level, the power source side output transistor 111 is turned off. When the voltage $V_D$ at the node D drops, becoming lower than the ground potential, the control signal F becomes high level, with the result that the ground side output transistor 112 is turned on. In this way, first of all, current $I_O$ in the positive direction flows from ground potential to the node D. When this happens, the voltage $V_D$ at the node D drops from ground potential by an amount of the voltage that is acquired by multiplying this current $I_O$ and the on resistance of the ground side output transistor 12.

After this, the current $I_O$ gradually decreases linearly, and, in response thereto, the negative voltage $V_D$ at the node D gradually rises in linear fashion. If the load 114 is large (not shown), the initial current value is large prior to the commencement of decrease of the current $I_O$. Therefore, before the current $I_O$ will become a current in the reverse direction, the control signal B returns to low level after the lapse of a period in which the control signal B is high level. In contrast, if the load 114 is light, the current $I_O$ becomes a current in the reverse direction before the high level period of the control signal B has lapsed. This reverse direction current is a current that flows out towards the ground potential, so it represents a power loss and the power efficiency of the switching regulator 101 is lowered to that extent. Accordingly, when the current becomes a reverse direction current, this is detected by the current direction detection circuit 116, which outputs low level control signal F. As a result, the voltage $V_C$ of the output signal C becomes low level and the ground side output transistor 112 is thereby forcibly turned off, so that the flow of this current in the reverse direction is minimized.

Thus, when the load is light, the ground side output transistor 112 is forcibly turned off when the current $I_O$ flows in the reverse direction, thereby making it possible to increase the power efficiency. The inventor of the present application, as a result of studies directed at achieving further improvements in power efficiency, discovered that there is a certain delay (period to in FIG. 4) from detection of the reverse direction current of the ground side output transistor 112 by the current direction detection circuit 116, before ground side output transistor 112 is turned off, and this delay allows a reverse direction current to flow for a certain period of time, which therefore results in power loss. Also, since the voltage $V_D$ at the node D has a wide range of variations from the power source voltage to below ground potential, the comparator 120 of the current direction detection circuit 116, which has as its input voltage a voltage of such a wide range of variations, must be larger in terms of the size of its circuitry compared with an ordinary comparator, whose input voltage is a voltage having a narrow range of variations.

Also, with the switching regulator 101, as shown in FIG. 4, there is a risk that a swing, i.e., ringing of the gradually decaying voltage generated after the forcible turning off of the ground side output transistor 112 will cause the voltage $V_D$ at the node D to drop below ground potential, resulting in instantaneous activation of the current direction detection circuit 116, with consequent wasted power consumption or generation of noise.

SUMMARY OF THE INVENTION

In order to overcome the problems described above, preferred embodiments of the present invention provide a current direction detection circuit wherein even better suppression of power losses can be achieved in a switching regulator, for example, and in which a small sized circuit can be provided. Another preferred embodiment of the present invention provides a switching regulator in which current losses can be minimized by such a current direction detection circuit and wherein there is no possibility of reactivation of the current direction detection circuit after detection of a reverse direction current.

According to a first preferred embodiment of the present invention, a current direction detection circuit for detecting a flow of current in the reverse direction in a ground side output transistor, through which current flows from a grounded input terminal to the output terminal, includes a monitoring transistor having a control terminal and an output terminal respectively connected with a control terminal and an output terminal of the ground side output transistor; an impedance element having one terminal connected with the input terminal of the monitoring transistor and the other terminal grounded; first and second constant-current sources; a diode-connected reference transistor interposed between the first constant-current source and ground potential; and a sensing transistor, interposed between the second constant-current source and the impedance element, having a control terminal connected with a control terminal of the reference transistor, wherein the voltage between the second constant-current source and the sensing transistor is output as a control signal to control the ground side output transistor and monitoring transistor.

A switching regulator according to another preferred embodiment of the present invention includes a power source side output transistor and a ground side output transistor provided in series between an input power source and ground potential; a smoothing circuit having an input terminal connected between the power source side output transistor and the ground side output transistor and an output terminal connected with a switching regulator output terminal that outputs a predetermined DC voltage; a regulator control circuit that performs on/off control of the power source side output transistor and ground side output transistor so as to maintain a predetermined DC voltage by inputting as feedback the voltage of the switching regulator output terminal; the current direction detection circuit according to claim 1; and a ground side output transistor control circuit that controls the ground side output transistor so as to maintain the ground side output transistor in a continuously turned off state once the control signal of the current direction detection circuit has risen, after being turned on by the control signal of the regulator control circuit.

In the current direction detection circuit according to the above-described preferred embodiments of the present invention, due to the configuration of the monitoring transistor, the impedance element, the first and second constant-current sources, the reference transistor, and the sensing transistor, the control signal is output upon detection of the condition just prior to the point where the current flowing in the ground side output transistor starts to flow in the reverse direction. Therefore, it becomes possible to further minimize the power loss thereof when used in a switching regulator, for example, and furthermore the size of the circuitry can be made small. Also, in the switching regulator according to the above-described preferred embodiments of the present invention, the current direction detection circuit cannot be reactivated after detection of the current in the reverse direction, so wasted power consumption produced by ringing or generation of noise can be minimized.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
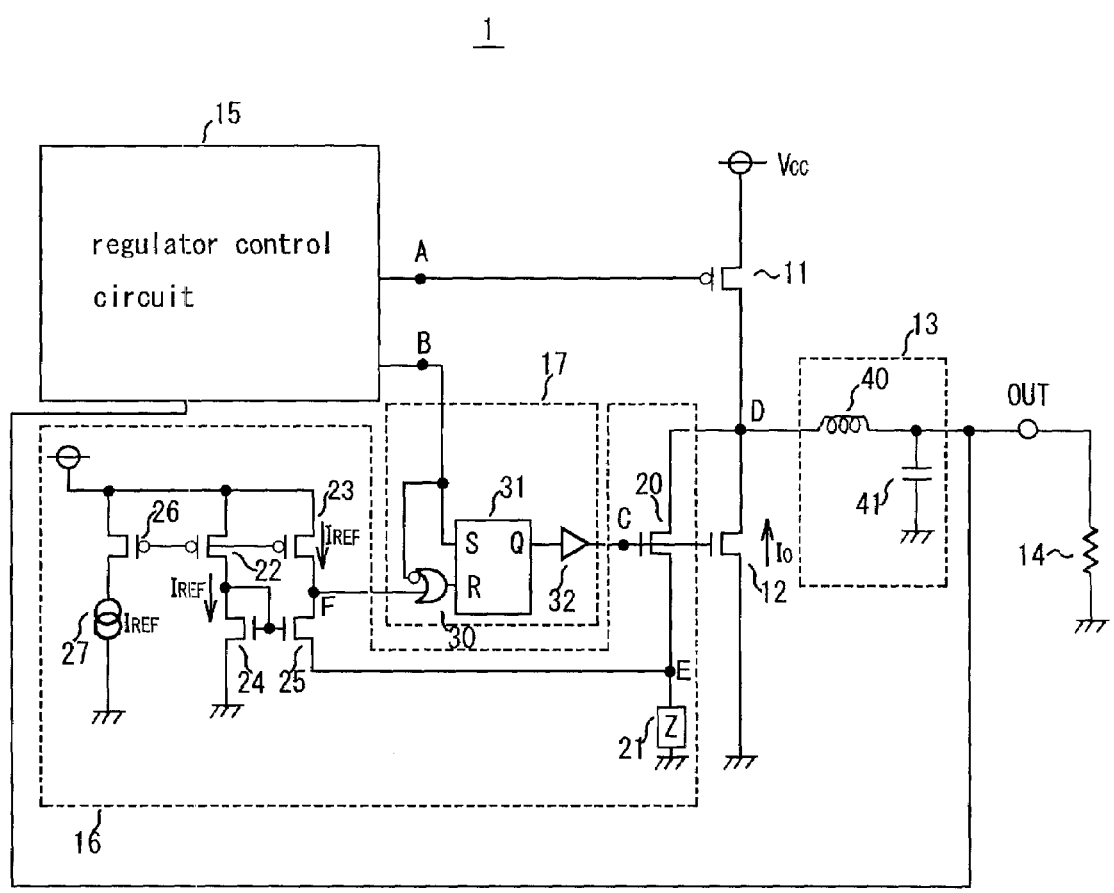
FIG. 1 is a circuit diagram of a current direction detection circuit according to a preferred embodiment of the present invention and a switching regulator including the same.

Preferred embodiments of the present invention are described below with reference to the drawings. FIG. 1 is a circuit diagram of a current direction detection circuit and a switching regulator including the same according to a preferred embodiment of the present invention. The switching regulator 1 includes a power source side output transistor 11 defined by a P type MOS transistor and a ground side output transistor 12 defined by an N type MOS transistor connected in series between the input power source $V_{CC}$ and ground potential; a smoothing circuit 13 having an input terminal connected between the two transistors 11, 12 and an output terminal connected to the output terminal (switching regulator output terminal) OUT; a regulator control circuit 15 that outputs a control signal A and control signal B that perform on/off control of the power source side output transistor 11 and ground side output transistor 12 so as to maintain a predetermined DC voltage by inputting as feedback the voltage of the output terminal OUT; a current direction detection circuit 16 that, when reverse direction current flows in the ground side output transistor 12, detects reverse direction current and outputs a control signal F; and a ground side output transistor control circuit 17 that outputs an output signal C for controlling the ground side output transistor 12 by means of the control signal B and control signal F. A load 14 is connected at the outside to the output terminal OUT. Also, the smoothing circuit 13 includes a smoothing coil 40 having one terminal connected with the connection point (node D) of the power source side output transistor 11 and the ground side output transistor 12 and the other terminal connected with the output terminal OUT, and a smoothing capacitor 41 having one terminal connected with the output terminal OUT and the other terminal grounded. Also, the control signal A and the control signal B outputted by the regulator control circuit 15 have substantially the same waveform.

The current direction detection circuit 16 includes a monitoring transistor 20 defined by an N type MOS transistor having the gate (control terminal) and drain (output terminal) respectively connected with the gate (control terminal) and drain (output terminal) of the ground side output transistor 12; an impedance element 21 having one terminal connected with the source (input terminal) of the monitoring transistor 20 and the other terminal grounded; first and second constant-current sources 22, 23 each defined by a P-type MOS transistor; a reference transistor 24, interposed between the first constant-current source 22 and ground potential, that is defined by a diode-connected (i.e., having its drain and gate mutually connected) N type MOS transistor; and a sensing transistor 25 defined by an N type MOS transistor, interposed between the second constant-current source 23 and impedance element 21, having a gate (control terminal) connected to the gate (control terminal) of the reference transistor 24. Also, the current direction detection circuit 16 includes a P-type MOS transistor 26 defining a current mirror circuit with the first and second constant-current sources 22, 23 and setting the current values of these elements, and a constant-current source 27 that generates the current that flows to the P-type MOS transistor 26. The current direction detection circuit 16 outputs as a control signal the voltage between the second constant-current source 23 and sensing transistor 25 (i.e., at the node F) and thereby controls the ground side output transistor 12 and the monitoring transistor 20 via the ground side output transistor control circuit 17.

Since the monitoring transistor 20 passes a current that is comparatively small in proportion to the current value of the ground side output transistor 12, it is set to a size of 1/N of the ground side output transistor 12 (N is a predetermined value). The impedance element 21 is an element that generates a voltage in response to the current that flows therein, and for the impedance element 21 there may be used, for example, a resistor or an N type MOS transistor whose on-resistance is a comparatively high value. The first constant-current source 22 and second constant-current source 23 have the capability of passing equal constant currents $I_{REF}$ (for example, about 1 μA). Also, the size of the reference transistor 24 is such that the connection point of the first constant-current source 22 and reference transistor 24 is high level. Then, in case the sizes of the reference transistor 24 and sensing transistor 25 are equal, if the voltage $V_E$ at the node E is substantially at least ground potential, the voltage $V_F$ at the node F (i.e., the voltage of the control signal that is output by the current direction detection circuit 16) is high level. In contrast, when the voltage $V_E$ at the node E drops substantially below the ground potential, the on-resistance of the sensing transistor 25 falls, with the result that the voltage $V_F$ at the node F becomes low level.

More specifically, the case where the voltage at the node E is at least ground potential includes the case where the monitoring transistor 20 is off and the case where the monitoring transistor 20 is on, but the voltage $V_D$ at the node D is at least ground potential. If the monitoring transistor 20 is off, current tries to flow from the second constant-current source 23 to the impedance element 21 (for example 1 KΩ), so the voltage at the node E rises slightly from ground potential. Also, if the monitoring transistor 20 is on and the voltage $V_D$ at the node D is at least ground potential, current flows through the monitoring transistor 20 and impedance element 21 from the node D, so the voltage $V_E$ at the node E becomes a value obtained by dividing the voltage $V_D$ at the node D by the on resistance of the monitoring transistor 20 and the resistance of the impedance element 21. In contrast, and more specifically, the case where the voltage $V_E$ at the node E drops below ground potential represents the case where the monitoring transistor 20 is on and the voltage $V_D$ at the node D is a voltage that is lower than ground potential, i.e., negative voltage. In this case, since the current flows from ground potential through the impedance element 21 and monitoring transistor 20, the voltage $V_E$ at the node E is a value obtained by dividing the negative voltage $V_D$ at the node D by the resistance of the impedance element 21 and the on resistance of the monitoring transistor 20.

Even more specifically, even in the case where the monitoring transistor 20 is on and the node D has a negative voltage, if this negative voltage value is small, the voltage $V_E$ at the node E may be ground potential or more. That is, if, for example, the "on" resistance value of the monitoring transistor 20 and the resistance value of the impedance element 21 are both R, the voltage $V_E$ at the node E is $V_E=(V_D+I_{REF} \times R)/2$.

As stated above, $I_{REF}$ is the constant current value of the second constant-current source 23. Since, when $V_D=-I_{REF} \times R$, $V_E$ is zero, even if the voltage $V_D$ at the node D is negative if it is smaller than ($I_{REF} \times R$), the voltage $V_E$ at the node E is at least ground potential. Thus, the voltage $V_D$ at the node D has an offset in the negative direction from the ground potential and is detected by the current direction detection circuit 16. The value of this offset can be adjusted by means of $I_{REF}$ or the resistance value of the impedance element 21. Using this, the fact that current in the reverse direction is about to flow in the ground side output transistor 12 can be detected just before this actually happens. This will be described below.

Next, the ground side output transistor control circuit 17 will be described. The ground side output transistor control circuit 17 includes an OR circuit 30 that inputs the inverted signal of the control signal B of the regulator control circuit 15 and a control signal F of the current direction detection circuit 16; an edge detection circuit 31 that inputs the control signal B at its set input terminal S, inputs the output of the OR circuit 30 at its reset input terminal R, and outputs the result from the non-inversion output terminal Q; and a buffer 32 that delivers the output of the edge detection circuit 31 with increased current capability. The edge detection circuit 31 outputs a high level from its non-inversion output terminal Q in response to the rising edge of the input signal of the set input terminal S, and maintains this condition, and outputs a low level from its non-inversion output terminal Q in response to the rising edge of the input signal of the reset input terminal R, and maintains this condition.

Figure 2:
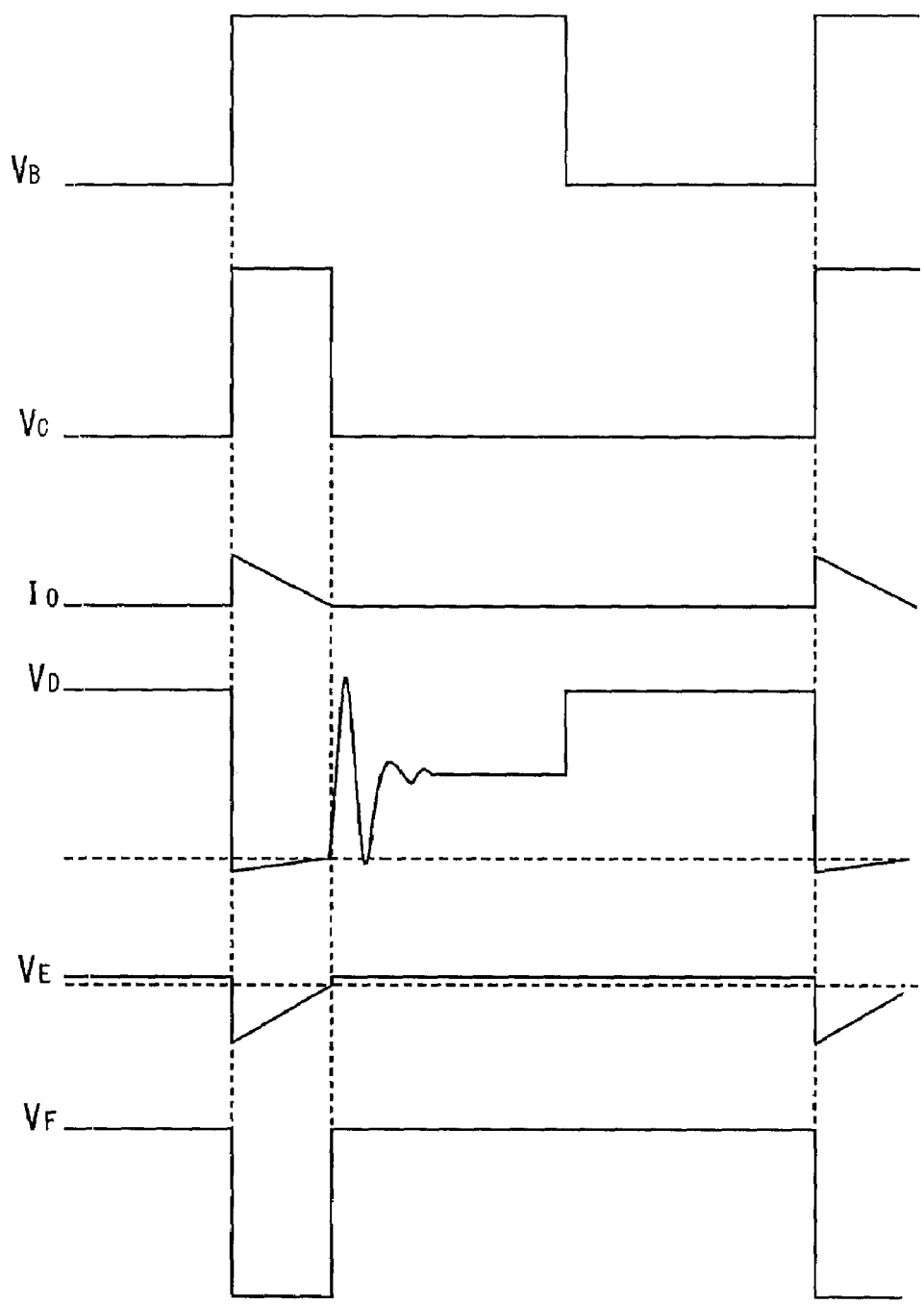
FIG. 2 is an operating waveform diagram of the switching regulator in FIG. 1.
Figure 3:
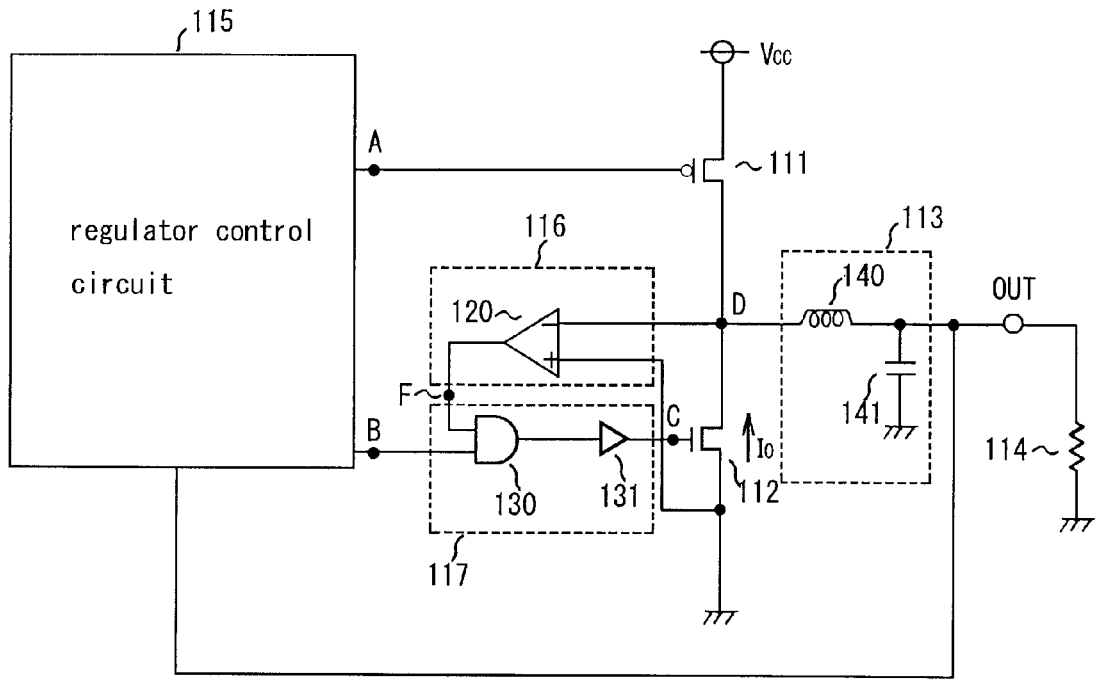
FIG. 3 is a circuit diagram of a switching regulator according to the background art.
Figure 4:
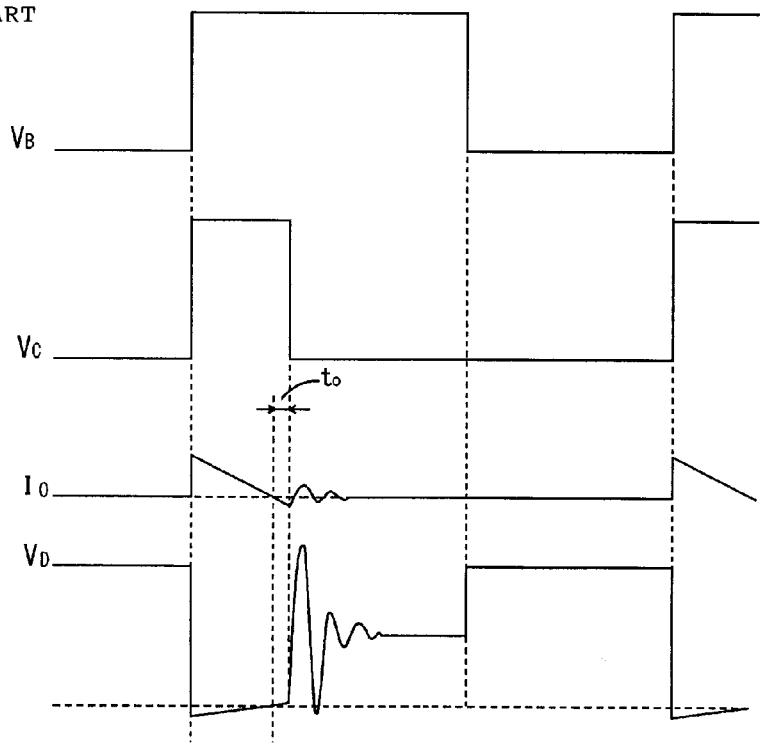
FIG. 4 is an operating waveform diagram of the switching regulator in FIG. 3.

Next, the operation of the switching regulator 1 will be described with reference to FIG. 2, focusing on the operation of the current direction detection circuit 16. In this figure, $V_B$ is the voltage of the control signal B of the regulator control circuit 15, $V_C$ is the voltage of the output signal C of the ground side output transistor control circuit 17, $I_O$ is the current flowing in the ground side output transistor 12, $V_D$ is the voltage at the node D, $V_E$ is the voltage at the node E, and $V_F$ is the voltage of the control signal F of the current direction detection circuit 16. The height of $V_E$ in this figure is shown to a larger scale. Also, FIG. 2 shows the waveform when the load 14 is light. The case where the load 14 is large is not shown.

In the period in which the control signal B is low level, the output signal C is low level and the ground side output transistor 12 and monitoring transistor 20 are turned off. The control signal A is also low level and the power source side output transistor 11 is turned on. Consequently, the current $I_O$ flowing in the ground side output transistor 12 is zero, and the voltage $V_D$ at the node D is high level. The monitoring transistor 20 is off, so, as described above, the voltage $V_E$ at the node E is raised slightly from the ground potential, causing the voltage $V_F$ at the node F to become high level.

When the control signal B becomes high level, the control signal A also becomes high level, so the power source side output transistor 11 is turned off. The ground side output transistor control circuit 17 then outputs a high level on receiving the rising edge of the control signal B, thereby turning on the ground side output transistor 12 and monitoring transistor 20. In response to turning on of the ground side output transistor 12, first of all, a current $I_O$ in the positive direction flows from ground potential to the node D. When this happens, the voltage $V_D$ at the node D is lowered from ground potential by an amount of the voltage that is acquired by multiplying this current $I_O$ and the on-resistance of the ground side output transistor 12. The voltage $V_E$ at the node E is also a negative voltage, and the voltage $V_F$ at the node F becomes low level.

After this, the current $I_O$ gradually decreases linearly, and in response to this the negative voltage $V_D$ at the node D and the voltage $V_E$ at the node E gradually increase linearly. If the load 14 is large (not shown), the initial current value is large prior to the commencement of decrease of the current $I_O$. Therefore, before the current $I_O$ will become a current in the reverse direction, the control signal B returns to low level after the lapse of the high level period. In this case, the ground side output transistor control circuit 17 delivers low level output on receipt of the trailing edge of the input control signal B, with the result that the ground side output transistor 12 and monitoring transistor 20 are turned off (not shown).

In contrast, when the load 14 is light, the current $I_O$ flowing in the ground side output transistor 12 tries to become a reverse direction current and the voltage $V_D$ at the node D tries to become positive voltage before the lapse of the high level period of the control signal B. However, as described above, since the voltage $V_D$ at the node D has an offset in the negative direction from ground potential, this situation is detected by the current direction detection circuit 16. In other words, the current direction detection circuit 16 detects the condition slightly prior to the current $I_O$ becoming a current in the reverse direction, and outputs a high level control signal at the node F. On receipt of the rising edge of this input control signal F of the current direction detection circuit 16, the ground side output transistor control circuit 17 then outputs a low level and thereby forcibly turns the ground side output transistor 12 off. Specifically, the ground side output transistor control circuit 17 effects control of the ground side output transistor 12 such that this output transistor 12 continues to be turned off once the control signal F of the current direction detection circuit 16 has risen after being turned on by the control signal B of the regulator control circuit 15.

Thus, by detection of this situation, just prior to the flow of current in the reverse direction in the ground side output transistor 12, the current direction detection circuit 16 compensates for the circuit delay produced by the current direction detection circuit 16 and the ground side output transistor control circuit 17 and thus minimizes power loss, thereby making it possible to increase the power efficiency. Compared with the current direction detection circuit 116 of the background art, whose input voltage is a voltage having a wide range of variations used in the switching regulator 101, the current direction detection circuit 16 has a very compact circuit construction and uses an input voltage having a narrow range of variations. The size of the current direction detection circuit 16 can therefore be made small.

When the ground side output transistor 12 is forcibly turned off, the voltage $V_D$ at the node D converges with ringing to the voltage level of the output terminal OUT and is then stabilized. However, when this happens, the ground side output transistor control circuit 17 controls the ground side output transistor 12 such that this ground side output transistor 12 remains turned off once the control signal F of the current direction detection circuit 16 has risen, so there is no risk of reactivation of the current direction detection circuit 16 by ringing, such as could occur in the switching regulator 101 in the background art.

It should be noted that, although the current direction detection circuit according to the preferred embodiments of the present invention is preferably for use with a switching regulator, it could also be used in other devices having a ground side output transistor that outputs current to a coil (such as, for example, a motor drive device).

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A current direction detection circuit for detecting a reverse flow of current in a ground side output transistor, through which current flows from a grounded input terminal to an output terminal, comprising:
   a monitoring transistor having a control terminal and an output terminal arranged to be connected, respectively, with a control terminal and an output terminal of the ground side output transistor;
   an impedance element having one terminal connected with the input terminal of the monitoring transistor and the other terminal grounded;
   first and second constant-current sources;
   a diode-connected reference transistor arranged between the first constant-current source and ground potential; and
   a sensing transistor arranged between the second constant-current source and the impedance element, the sensing transistor having a control terminal connected with a control terminal of the reference transistor; wherein
   a voltage between the second constant-current source and the sensing transistor is output as a control signal to control the ground side output transistor and monitoring transistor.

2. A switching regulator comprising:
   a power source side output transistor and a ground side output transistor provided in series between an input power source and ground potential;
   a smoothing circuit having an input terminal connected between the power source side output transistor and the ground side output transistor and an output terminal connected with a switching regulator output terminal that outputs a predetermined DC voltage;
   a regulator control circuit that performs on/off control of the power source side output transistor and ground side output transistor so as to maintain a predetermined DC voltage by inputting as feedback the voltage of the switching regulator output terminal;
   the current direction detection circuit according to claim 1; and a ground side output transistor control circuit arranged to control the ground side output transistor so as to maintain the ground side output transistor turned off once the control signal of the current direction detection circuit has risen, after being turned on by the control signal of the regulator control circuit.

* * * * *